United States Patent [19]

Tokuda et al.

[11] Patent Number: 5,347,743
[45] Date of Patent: Sep. 20, 1994

[54] GUIDE FOR USE ON A FISHING ROD

[75] Inventors: Isamu Tokuda; Kenji Onishi, both of Sakai, Japan

[73] Assignee: Shimano Inc., Osaka, Japan

[21] Appl. No.: 953,659

[22] Filed: Oct. 13, 1992

[30] Foreign Application Priority Data

Oct. 23, 1991 [JP] Japan .................. 3-274415
Nov. 20, 1991 [JP] Japan .................. 3-304444

[51] Int. Cl.5 ............................ A01K 87/04
[52] U.S. Cl. ............................... 43/24
[58] Field of Search .................. 43/24, 18.1

[56] References Cited

U.S. PATENT DOCUMENTS

| | | | |
|---|---|---|---|
| 1,984,349 | 12/1934 | Gurrieri et al. | 43/24 |
| 2,914,882 | 12/1959 | Marke | 43/24 |
| 3,171,228 | 3/1965 | Cwik | 43/24 |
| 3,417,501 | 12/1968 | Fulop | 43/24 |
| 4,218,841 | 8/1980 | Gallagher et al. | 43/24 |
| 4,467,549 | 8/1984 | Deqwet | 43/24 |
| 4,888,906 | 12/1989 | Yamato | 43/24 |

FOREIGN PATENT DOCUMENTS 36-24856 9/1935 Japan .
63-181266 11/1988 Japan .

Primary Examiner—P. Austin Bradley
Assistant Examiner—Jeanne M. Elpel
Attorney, Agent, or Firm—Dickstein, Shapiro & Morin

[57] ABSTRACT

A guide for use on a fishing rod includes a guide ring placed in contact with an outer surface of a rod stock for guiding a fishing line, and a holder for fixing the guide ring to the rod stock. The guide is manufactured by placing the guide ring in contact with an outer surface of the rod stock, arranging dies to surround the guide ring and rod stock, and injecting a plastic inside the dies, thereby forming the holder from the plastic. As an alternative to the use of dies, prepreg may be wound in a way to fasten the guide ring to the rod stock, and baked to harden, thereby forming the holder.

9 Claims, 8 Drawing Sheets

GUIDE FOR USE ON A FISHING ROD

BACKGROUND OF THE INVENTION

FIELD OF THE INVENTION

This invention relates to a guide for use on a fishing rod and a method of manufacturing the guide, and to a fishing rod using this guide and a method of manufacturing the fishing rod.

DESCRIPTION OF THE RELATED ART

Conventional guides for use on fishing rods are known from Japanese Utility Model Publication No. 36-24856 and Japanese Utility Model Publication Kokai No. 63-181266. The former publication discloses a top guide having a guide ring formed of ceramic or the like and attached to a forward end of a tip rod section through a holder formed of plastic or the like. The latter discloses a guide having a guide ring formed of ceramic or the like and supported by a holder formed of metal or the like fitted on a rod stock. Although the guide in the latter publication is movable, a fixed guide is constructed basically in the same way.

The former has the advantage of forming the top guide relatively easily in that the holder with the guide ring is attached to the forward end of the tip rod section. However, this guide has the disadvantage that the holder formed of plastic or the like and lying between the guide ring and the rod attenuates vibrations of a fishing line. This renders timing of hooking and landing a fish difficult where this action relies on a subtle strike of the fish, for example.

The latter also has the disadvantage that, where the guide is disposed adjacent a tip end of the rod, the holder attenuates vibrations of a fishing line, making a grasp of strikes difficult. Further, where, as in this prior example, the guide ring projects to a large extent from the rod stock, the fishing line often becomes entangled on the holder. A guide projecting a less amount is desired.

In addition, it is desirable for a guide to be rigidly secured to the rod stock in order to distribute to the fishing rod reliably any great tension applied to the fishing line.

SUMMARY OF THE INVENTION

Objects of the present invention are to provide a fixed guide for enabling the angler to grasp light strikes with ease and reducing the possibility of line entanglement, to provide an improved method of manufacturing the guide, and to provide a fishing rod employing this guide and a method of manufacturing the fishing rod.

In one aspect of the present invention, a guide for use on a fishing rod is provided which comprises a guide ring placed in contact with an outer surface of a rod stock for guiding a fishing line, and a holder for fixing the guide ring to the rod stock.

These features may be arranged as shown in FIGS. 1 through 3, for example. A guide ring 2 is placed in contact with a rod stock R. When a fish strikes a bait and vibrates a fishing line, the vibrations are transmitted from the guide ring 2 directly to the rod stock R. Compared with the prior art construction, the vibrations are not attenuated by a holder 3, and the guide projects a reduced amount from the rod stock R.

Where the guide is constructed as shown in FIG. 10, the guide ring 2 defines the same opening diameter as in the prior art, but defines a larger opening width than the prior art. This reduces the frequency of contact between the guide ring 2 and fishing line, thereby reducing friction occurring with winding and unwinding of the fishing line.

Where the guide is constructed as shown in FIG. 6, the edge of the guide ring 2 remotest from the fishing rod is smoothly continuous with an outer surface of the rod stock R through the holder 3. Even if the fishing line may contact this part, the fishing line is moved away from the rod stock along the holder 3 without becoming entangled on the guide ring 2.

Where the guide is constructed as shown in FIG. 11, the guide ring 2 is depressed radially of a tip rod section 1 as viewed axially of the tip rod section 1. Thus, the guide ring 2 projects a reduced amount from the tip rod section 1.

In another aspect of the invention, a method of manufacturing a guide for use on a fishing rod is provided which comprises the steps of placing a guide ring for guiding a fishing line in contact with an outer surface of a rod stock, arranging dies to surround the guide ring and the rod stock, and injecting a plastic inside the dies, thereby forming a holder from the plastic for fixing the guide ring to the rod stock.

Where this method is executed as shown in FIG. 4, a guide ring 2 need not be formed separately, but may be formed of plastic to be integral with a rod stock R. There is no gap between guide ring 2 and rod stock R.

Further, a guide for use on a fishing rod may be manufactured, according to the present invention, by a method comprising the steps of placing a guide ring for guiding a fishing line in contact with an outer surface of a rod stock, winding prepreg in a way to fasten the guide ring to the rod stock, and baking the prepreg to harden, thereby forming a holder.

Where this method is executed as shown in FIGS. 5 and 6, a holder 3 may be formed by using the same baking equipment used for baking a rod stock R, without requiring additional equipment. After the baking, the holder 3 is formed of a material having the same quality as the rod stock R.

Where this method is executed as shown in FIG. 5, prepreg P2 is wound around a guide ring 2 and elastic elements 7. This stabilizes a posture of the guide ring 2, and the elastic elements 7 absorb any variations in the diameter of prepreg P2 occurring at a baking time.

Thus, the present invention provides a fixed guide which enables the angler to grasp a subtle strike of a fish, and reduces the possibility of line entanglement. The invention also provides improved methods of forming such a guide in a reliable way.

In a further aspect of the invention, a fishing rod comprises a fixed guide including guide rings placed on a holder fixed to a rod stock, wherein the holder is formed of a material contacting the rod stock as viewed axially of the rod stock, an outer surface of the holder being smoothly continuous with an outer surface of the rod stock, the holder including a pair of inclined surfaces which converge away from the rod stock as viewed in a direction perpendicular to an axis of the rod stock, the guide rings being mounted on the inclined surfaces, respectively.

These features may be arranged as shown in FIG. 19, for example. An outer surface of a holder 3 is smoothly continuous with an outer surface of a rod stock R. Therefore, even when a fishing line contacts the fixed guide G, no line entanglement takes place. The fishing line may entwine on the fixed guide G adjacent the guide rings 2, but the shape of the holder 3 converging away from the rod stock facilitates escape of the fishing line in a direction away from the rod stock.

In a still further aspect of the invention, a method of manufacturing a fishing rod is provided which comprises the steps of forming a small diameter portion on an outer surface of a rod stock; placing dies to surround the small diameter portion; injecting a plastic into an interior space of the dies, thereby forming a holder integral with the rod stock, an outer surface of the holder being smoothly continuous with an outer surface of the rod stock, the holder including a pair of inclined surfaces which converge away from the rod stock as viewed in a direction perpendicular to an axis of the rod stock; and placing guide rings on the inclined surfaces, respectively, thereby forming a fixed guide.

This method may be executed as shown in FIGS. 19 through 21, for example. By injecting a plastic inside dies 4, a holder 3 is formed integral with a rod stock R, with an outer surface of the holder 3 smoothly continuous with an outer surface of the rod stock R. Line guide rings 2 are formed by injecting the plastic, which makes it unnecessary to manufacture the holder 3 from a special material in advance.

Alternatively, a fishing rod is manufactured, according to the present invention, by a method comprising the steps of forming a small diameter portion on an outer surface of a rod stock; winding prepreg around the small diameter portion; baking the prepreg, thereby forming a holder integral with the rod stock, an outer surface of the holder being smoothly continuous with an outer surface of the rod stock, the holder including a pair of inclined surfaces which converge away from the rod stock as viewed in a direction perpendicular to an axis of the rod stock; and placing guide tings on the inclined surfaces, respectively, thereby forming a fixed guide.

This method may be executed as shown in FIGS. 22 through 25, for example. By baking prepreg P2, a holder 3 is formed integral with a rod stock R, with an outer surface of the holder 3 smoothly continuous with an outer surface of the rod stock R. The holder 3 is formed of prepreg P2, which makes it unnecessary to manufacture the holder 3 separately in advance.

Thus, the present invention provides a fishing rod having a fixed guide free from line entanglement. The invention also provides improved methods of manufacturing a fishing rod which reduces the possibility of line entanglement, which is free from chattering even after a long period of use, and which has a fixed guide formed in a simple and convenient way.

Particularly, according to the present invention, the holder and rod stock define a smooth connection therebetween, with no rugged undulations formed on outer surfaces thereof. This feature provides the advantage of inflicting no injury to a hand touching the holder.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENTS

Embodiments of the present invention will be described in detail hereinafter with reference to the drawings.

Figure 1:
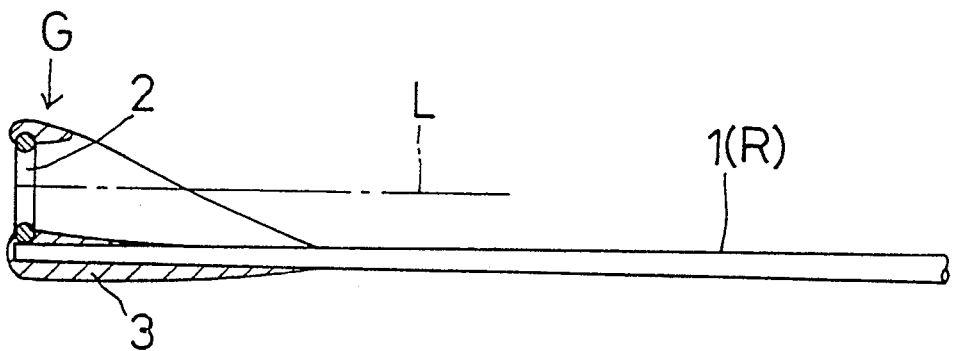
FIG. 1 is a sectional view of a top guide having a plastic holder according to the present invention.
Figure 2:
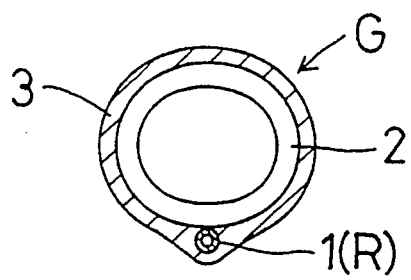
FIG. 2 is a vertical section of the guide shown in FIG. 1.
Figure 3:
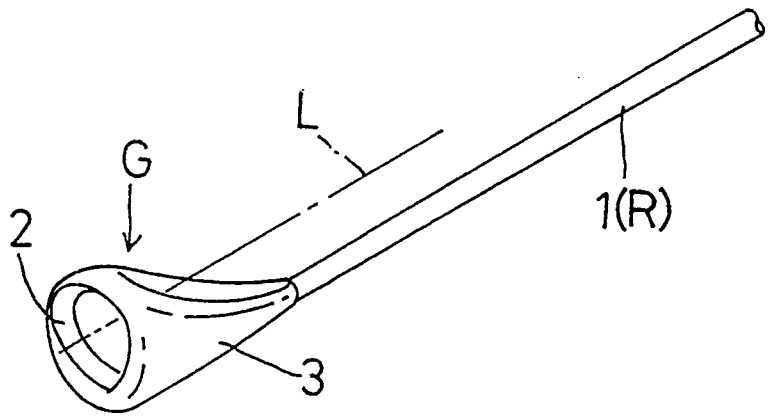
FIG. 3 is a perspective view of the guide.

FIGS. 1 through 3 show a forward end of a tip rod section 1 having a top guide G.

This guide G includes an elliptic guide ring 2 placed in contact with an outer surface of the forward end of the tip rod section 1 acting as a rod stock R, and a plastic holder 3 for fixing the guide ring 2 to the tip rod section 1. As shown in FIG. 2, the guide ring 2 has an outer surface of a lower side in the direction of the shorter diameter contacting the outer surface of the tip rod section 1.

The guide ring 2 is formed of a ceramic material, such as silicon carbide, having excellent wear resistance.

Figure 4:
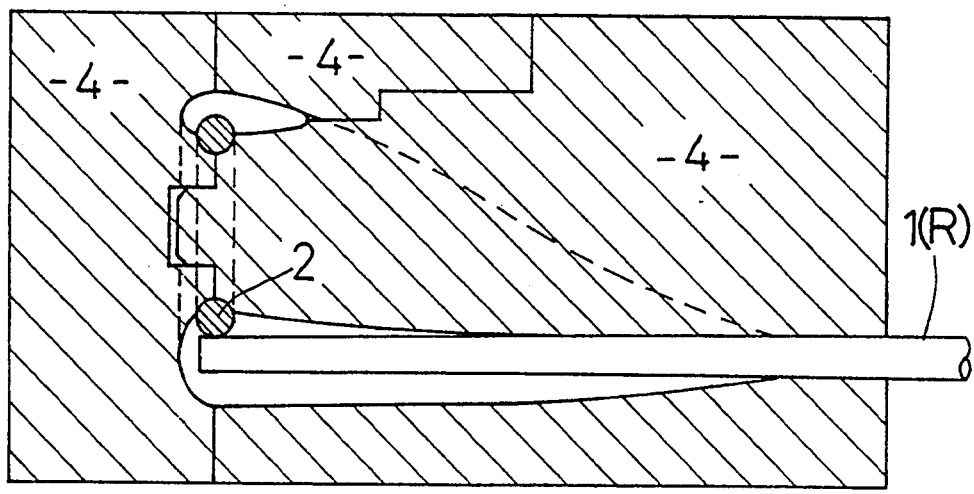
FIG. 4 is a sectional view of dies.

The holder 3 is formed fast on the outer surface of the tip rod section 1 by injection. Specifically, as shown in FIG. 4, the guide ring 2 is placed in contact with the forward end of the tip rod section 1 for injection molding. A plurality of dies 4 are fitted to one another with the guide ring 2 held inside. Then, a plastic is injected inside the dies 4.

With the fishing rod having the guide G formed as above, a fishing line is fed smoothly along a guide path L passing through the opening of the guide ring 2. Vibrations of the fishing line are transmitted, without being attenuated, through the guide ring 2 to the rod stock R, thereby enabling the angler to grasp fish strikes reliably. Furthermore, the holder 3 effectively prevents the fishing line from becoming entangled on the guide G.

Another embodiment will be described next.

Figure 5:
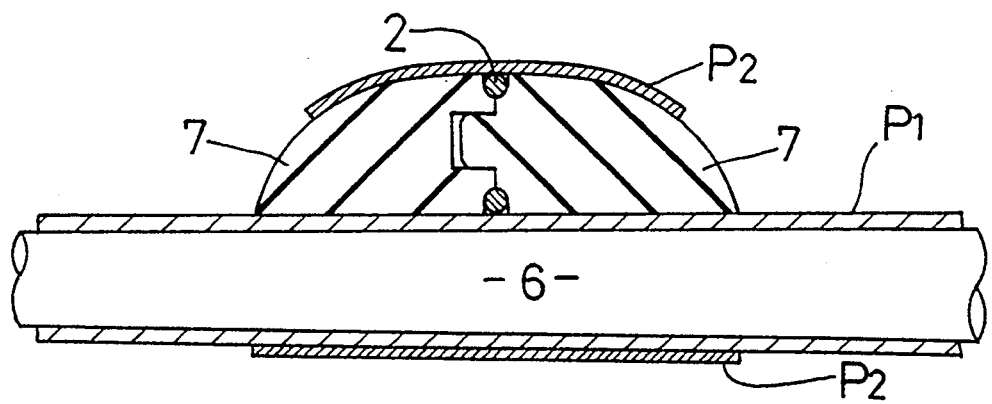
FIG. 5 is a sectional view showing prepreg sheets wound.
Figure 6:
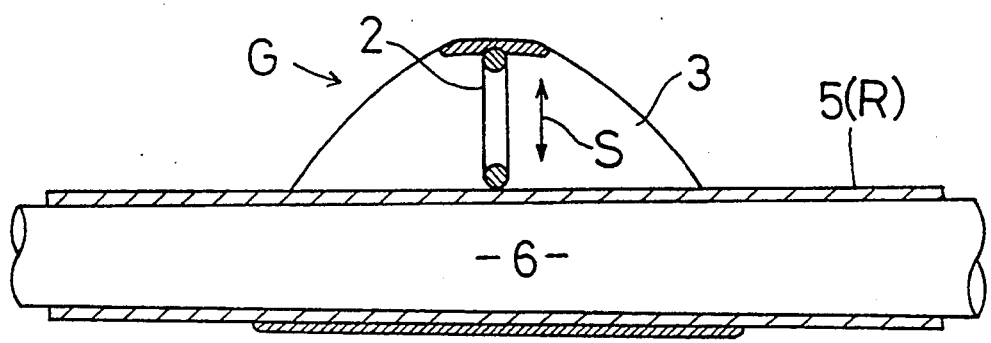
FIG. 6 is a sectional view of a holder formed of prepreg.

FIGS. 5 and 6 show a method of forming a fixed guide G on an intermediate rod section 5 acting as a rod stock R. In this method, a holder 3 is formed of prepreg P2 which is of the same quality as prepreg P1 used for forming the intermediate rod section 5.

According to this method, prepreg P1 is wound around a mandrel 6 for forming the intermediate rod section 5, and a ceramic guide ring 2 is placed in contact with an outer surface of the prepreg P1. Then, elastic elements 7 such as rubber elements are fitted axially of the rod stock R (or mandrel 6) so as to sandwich the guide ring 2. In this state, the prepreg P2 is wound around the guide ring 2 and elastic elements 7.

Figure 7:
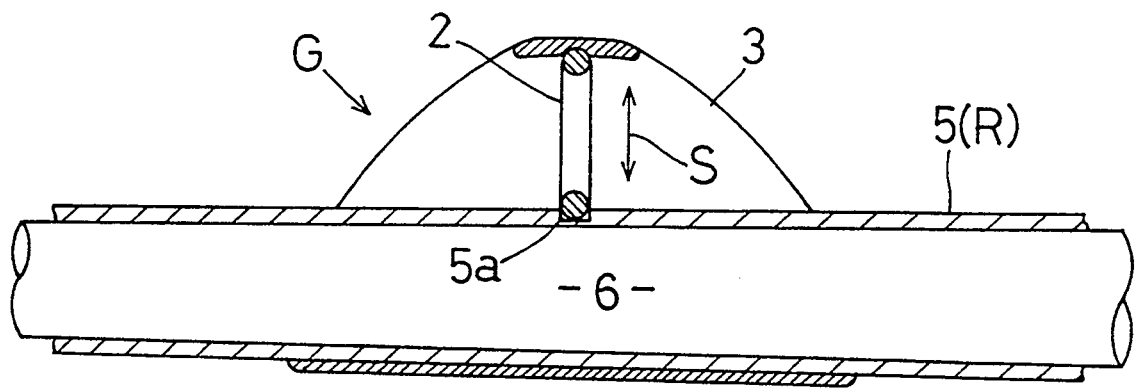
FIG. 7 is a sectional view of a guide having a holder formed of prepreg in another embodiment.

As shown in FIG. 7, a groove 5a may be formed in the prepreg P1 forming the intermediate rod section 5. This conveniently facilitates positioning of the guide ring 2.

Figure 8:
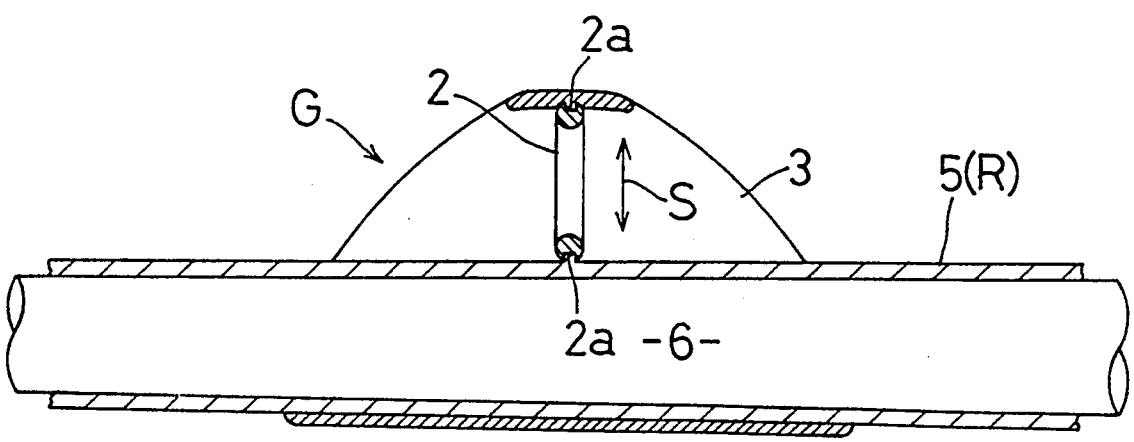
FIG. 8 is a sectional view of a guide having a holder formed of prepreg in a further embodiment.

As shown in FIG. 8, the guide ring 2 may include an engaging device 2a in the form of a groove defined in an outer periphery thereof. This provides the advantage of promoting cohesion between the guide ring 2 and the prepreg P2 wound thereon. This engaging device 2a may comprise a ridge instead of the groove.

The prepreg P2 for forming the holder 3 is in the form of a paralleled fiber sheet as is the prepreg P1 for forming the rod stock R. The fibers are aligned in a direction S which corresponds to the circumferential direction of the rod stock R.

A heat-contractive tape (not shown) is wound around each of the prepreg P1 for forming the rod and the prepreg P2 for forming the holder. The prepreg sheets P1 and P2 with the tape wound therearound are hardened through a baking process.

Figure 9:
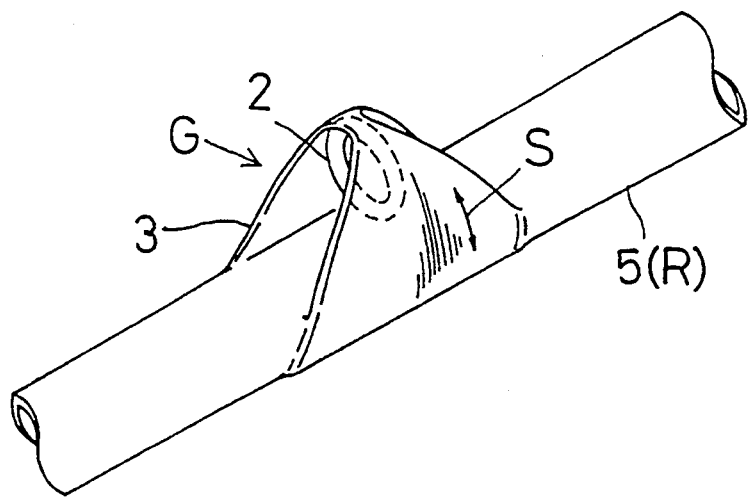
FIG. 9 is a perspective view of the guide having the holder formed of the prepreg in the embodiment shown in FIG. 6.

Subsequently, the elastic elements 7 are removed, and unnecessary portions of the holder 3 formed in fore and aft positions of the guide ring 2 are cut. The product is then polished and painted to complete a guide G as shown in FIG. 9.

Other embodiments of the present invention will be described hereinafter.

Figure 10:
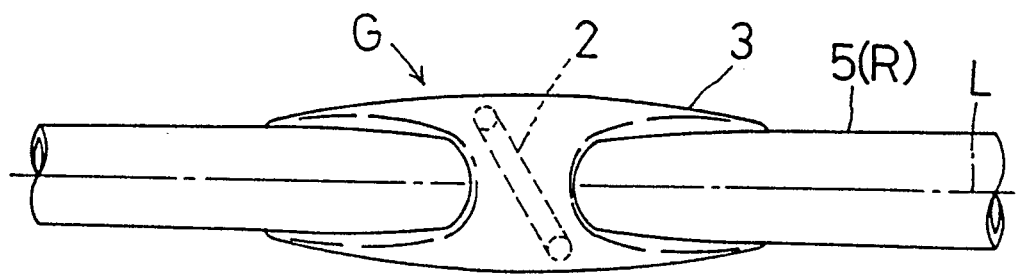
FIG. 10 is a plan view of a different embodiment (a)

(a) As shown in FIG. 10, an elliptic guide ring 2 has an outer surface of a lower side in the direction of the shorter diameter contacting an outer surface of a rod stock R, as in the preceding embodiments. An opening plane of the guide ring 2 is placed at an angle to a line guide path L, so that outer edges of the guide ring 2 in the direction of the longer diameter lie close to the guide path L. A holder 3 is shaped approximately trapezoidal, with the side of the guide ring 2 remote from the rod forming an apex thereof. Thus, in side view, the holder 3 flares axially of the rod stock R as it progresses toward the latter.

Figure 11:
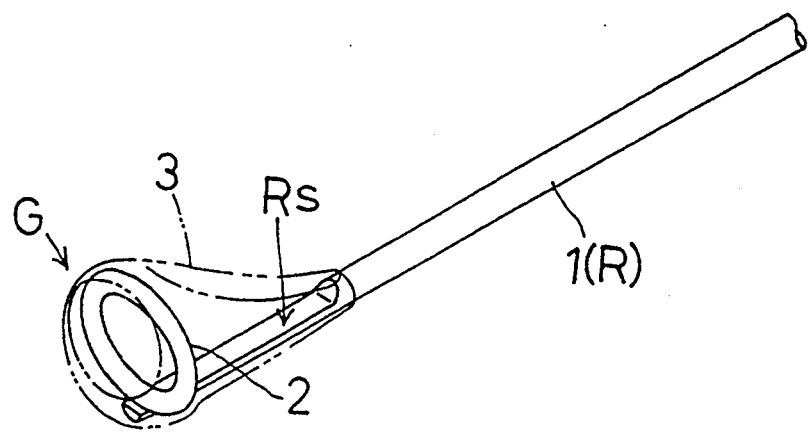
FIG. 11 is a perspective view of a different embodiment (b)

(b) As shown in FIG. 11, a tip rod section 1 has a side of a forward portion thereof removed to define a cutout surface Rs. A guide ring 2 is placed in contact with a forward end of this cutout surface Rs. Then, a holder 3 is formed by any one of the foregoing methods to support the guide ring 2. The resulting top guide has the guide ring 2 depressed radially of the rod stock R.

Figure 12:
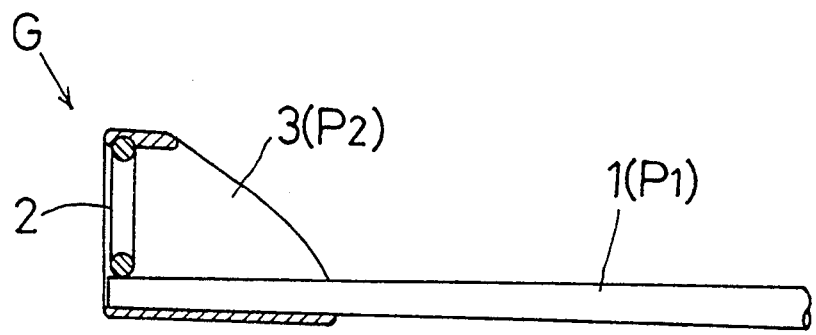
FIG. 12 is a sectional view of a different embodiment (c)

(c) As shown in FIG. 12, a guide G having a holder 3 formed of prepreg P2 is used as a top guide. This top guide is integrated with a tip rod section to provide an improved sensitivity of the rod.

Figure 13:
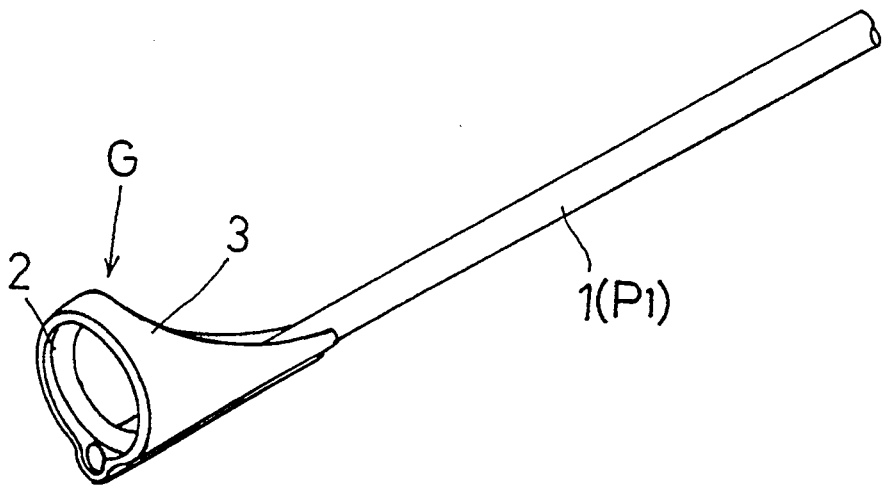
FIG. 13 is a perspective view of a different embodiment (d)

(d) As shown in FIG. 13, a holder 3 may be formed of metal or the like separately, and assembled to a rod stock. Where, as illustrated, the holder 3 of a top guide is formed of metal or other rigid material, not only has the guide an increased strength but the rod has an improved sensitivity.

Figure 14:
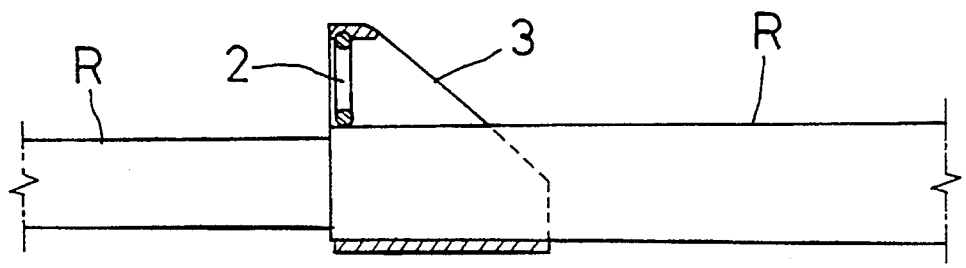
FIG. 14 is a side view, partly in section, of a different embodiment (e)
Figure 15:
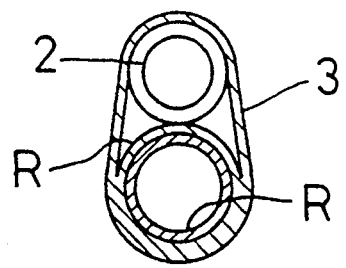
FIG. 15 is a front view in vertical section of the different embodiment (e)

(e) As shown in FIGS. 14 and 15, a guide ring 2 is placed in contact with a forward end of an intermediate rod section R of a telescopic fishing rod. This guide ring 2 is supported by a holder 3 formed of prepreg as in the preceding embodiment or of plastic. In this embodiment, the guide ring 2 has a circular shape and is formed of ceramic or the like having excellent wear resistance.

Figure 16:
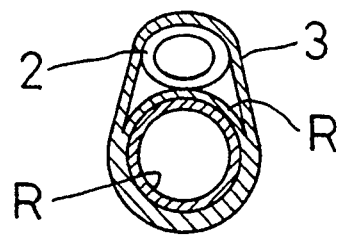
FIG. 16 is a front view in vertical section of a different embodiment (f)

(f) As shown in FIG. 16, as in the above embodiment, a guide ring 2 is placed in contact with a forward end of an intermediate rod section R of a telescopic fishing rod. This guide ring 2 is supported by a holder 3 formed of prepreg or plastic. In this embodiment, the guide ring 2 is shaped elliptic as seen from the front (axially of the rod).

Figure 17:
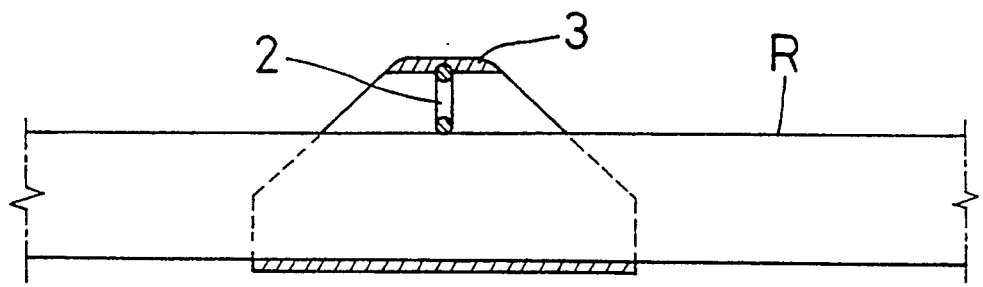
FIG. 17 is a side view, partly in section, of a different embodiment (g)
Figure 18:
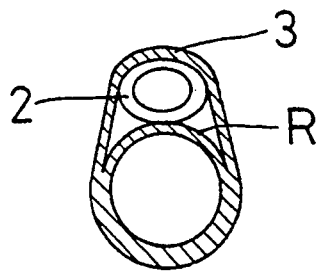
FIG. 18 is a front view in vertical section of the different embodiment (g)

(g) As shown in FIGS. 17 and 18, a guide ring 2 is placed in contact with an intermediate position of an intermediate rod section R of a telescopic fishing rod. This guide ring 2 is supported by a holder 3 formed of prepreg or plastic. In this embodiment, the guide ring 2 is shaped elliptic as seen from the front (axially of the rod).

The present invention does not exclude an example where a guide ring and holder are formed integral as a unit. A fixed guide may be formed with a holder integrated with a rod. This is achieved, for example, by forming a guide ring and a holder of ceramic as an integral unit, placing the guide ring and holder in contact with a prepreg sheet when manufacturing the rod, winding the prepreg around part of the holder, and baking the product.

This guide may be used as a top guide.

A holder may be formed by winding a prepreg sheet around a rod stock formed through a first baking process, and thereafter carrying out a second baking process.

A further embodiment will be described hereinafter.

Figure 19:
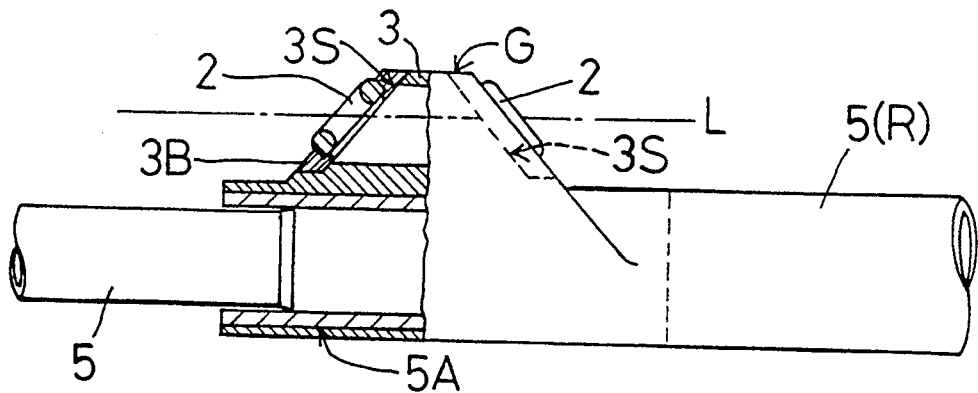
FIG. 19 is a side view, partly in section, of a fixed guide in a further embodiment.
Figure 20:
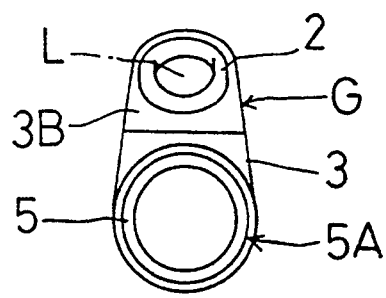
FIG. 20 is a front view of the fixed guide shown in FIG. 19.

FIGS. 19 and 20 show a fixed guide G formed on an intermediate rod section 5 (one example of rod stock R) of a telescopic fishing rod. This guide G includes a pair of ceramic guide tings 2 supported by a holder 3 integrated with the intermediate rod section 5.

The holder 3 is formed of a plastic material surrounding and contacting the intermediate rod section 5. The holder 3 is fixed to a small diameter portion 5A of the intermediate rod section 5 so that an outer surface of the holder 3 is smoothly continuous with an outer surface of the intermediate rod section 5. The holder 3 includes a pair of inclined surfaces 3S which converge away from the rod as viewed in a direction perpendicular to an axis of the intermediate rod section 5. The guide rings 2 are mounted on the inclined surfaces 3S through plates 3B, respectively.

This guide is formed on a forward end of the intermediate rod section 5 which receives a different intermediate rod section 5 to be extendible and retractable relative thereto.

Figure 21:
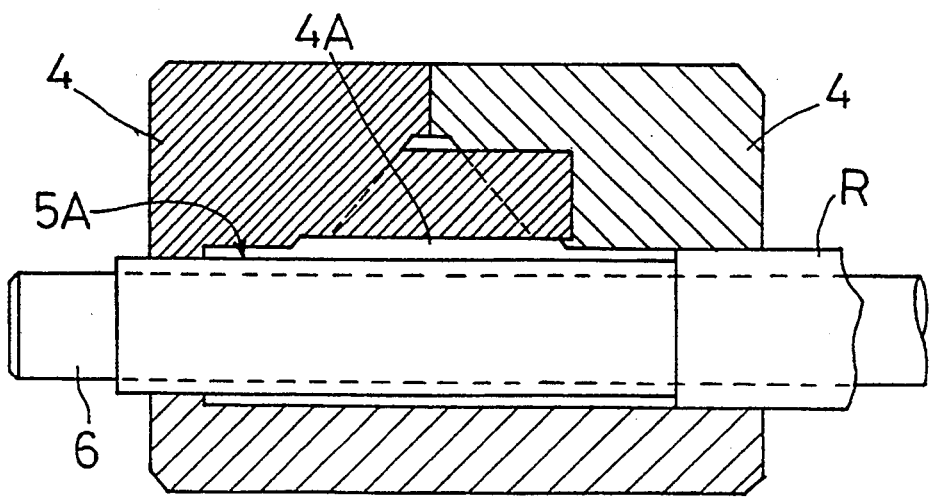
FIG. 21 is a sectional view showing a die casting process for the fixed guide shown in FIG. 19.
Figure 22:
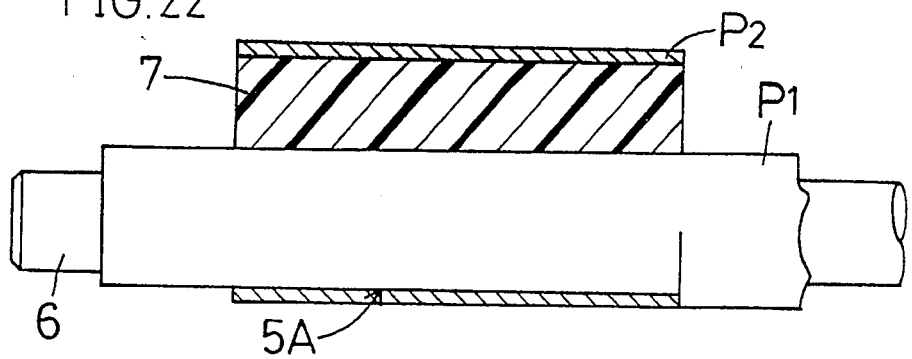
FIG. 22 is a sectional view showing a prepreg winding process for the fixed guide shown in FIG. 19.

The holder 3 is formed simultaneously with the intermediate rod section 5. As shown in FIG. 21, a small diameter portion 5A is formed on a material wound around a mandrel 6 to form the intermediate rod section 5 (which is illustrated as having been baked). Dies 4 are placed to surround the small diameter portion 5A, and the holder 3 is formed by injecting a plastic into an interior space 4A of the dies 4.

The line guide rings 2 are mounted on the inclined surfaces 3S through the plates 3B, in postures following the inclined surfaces 3S, respectively. Thus, the guide rings 2 have opening planes inclined with respect to a line guide path L. According to this construction, a fishing line, when caught by the holder, can be freed with ease. Further, since the outer surface of the holder 3 is smoothly continuous with the outer surface of the intermediate rod section 5 as noted above, there is no possibility of the fishing line becoming caught between the holder 3 and intermediate rod section 5.

FIGS. 22 through 25 show a process of forming the holder 3 from prepreg. In this process, the small diameter portion 5A is formed on an outer surface of prepreg P1 wound around a mandrel 6 for forming the rod stock. A soft material 7 such as rubber is placed opposite the small diameter portion 5A. Prepreg P2 having the same quality as prepreg P1 is wound around the soft material 7 and prepreg P1. A heat-contractive tape (not shown) is wound around prepreg P1 and prepreg P2, and the product is baked. As a result, the holder 5 is formed integral with the intermediate rod section 5.

Figure 23:
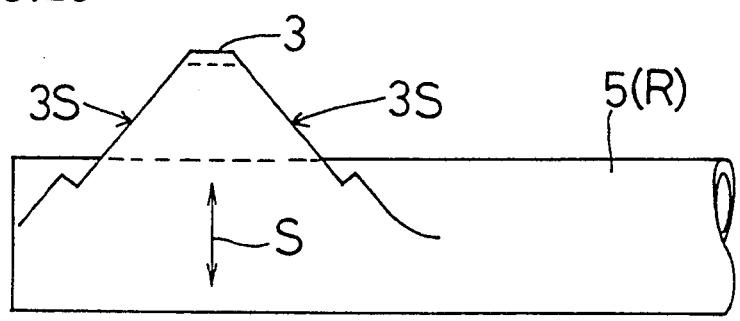
FIG. 23 is a side view of a holder configuration after shaping of the fixed guide shown in FIG. 19.

After the baking, the forward end of the rod is cut, the soft material 7 is removed, and edges of the holder 3 are shaped, whereby the inclined surfaces 3S are formed at angles to the line guide path L as shown in FIG. 23. The guide rings 2 are attached to the inclined surfaces 3S through the plates 3B as noted above. The fixed guide G is completed after a required surface treatment.

Figure 25:
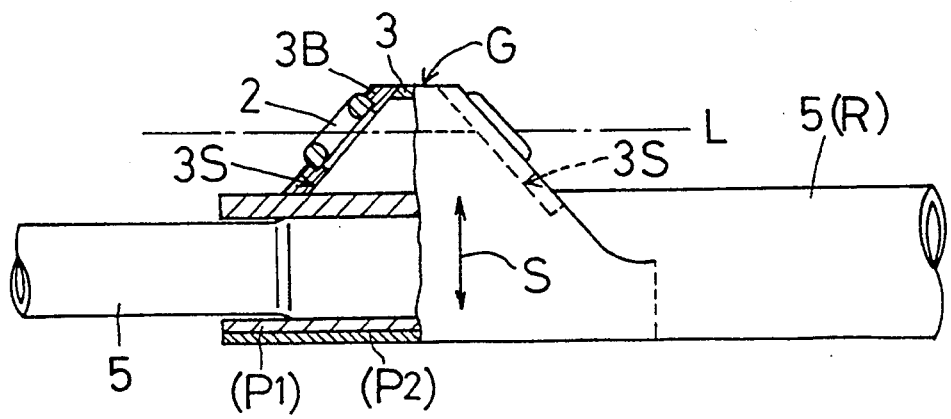
FIG. 25 is a side view, partly in section, of the fixed guide shown in FIG. 19.

As shown in FIGS. 23 and 25, the prepreg 172 has fibers aligned in a direction S corresponding to the circumferential direction of the rod stock R in order to secure increased strength. When baking the rod stock R, the prepreg P1 forming the rod stock R and the prepreg P2 forming the holder 3 fuse together to form a rigid unit. Consequently, the intermediate rod section 5 may be drawn out by holding the fixed guide G, with no possibility of detachment of the fixed guide G.

Figure 24:
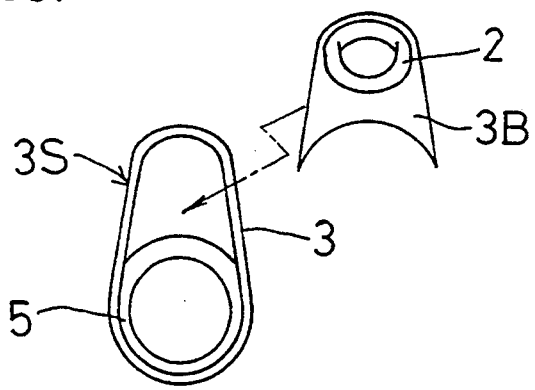
FIG. 24 is a front view showing the holder configuration of the fixed guide shown in FIG. 19.

The rod stock R and holder 3 are integrated into a rigid structure as noted above. However, FIGS. 24 and 25 show these two components as separate units for the purpose of illustration.

The above embodiment may be modified as follows:
(h) The fixed guide as constructed above may be formed on a forward end of a tip rod section to act as a top guide. This top guide eliminates the possibility of line entanglement. Where this top guide is applied to a telescopic fishing rod, the angler may grip the top guide to extend the rod without the fear of detaching the top guide.
(i) With the holder formed of prepreg, the guide rings may be placed in contact with the prepreg when the latter is wound. Then, the guide rings become fast with the holder after a baking treatment. In this method, and in the method described hereinbefore, a prepreg sheet may be wound around the rod stock after the baking step, and then baked again to form the guide ring or rings integral with the rod stock.
(j) Where the holder is formed by using dies, at least one of the guide rings may be integrated with the holder by injecting a plastic into the interior space of the dies with the guide ring or rings set in place beforehand.

What is claimed is:

1. A guide for use on a fishing rod comprising:
a guide ring placed in contact with an outer surface of a rod stock for guiding a fishing line; and
a holder for fixing said guide ring to said rod stock, said holder being shaped approximately trapezoidal, with a side of said guide ring remote from said rod stock forming an apex thereof, said holder, in side view, flaring axially of said rod stock progressively toward said rod stock;
an outer surface of said holder being smoothly continuous with an outer surface of said rod stock.

2. A guide as claimed in claim 1, wherein said guide ring defines a substantially elliptic opening for receiving said fishing line, and has an outer edge in a direction of shorter diameter contacting the outer surface of said rod stock, an opening plane of said guide ring being inclined with respect to a line guide path so that outer edges in a direction of longer diameter lie close to said line guide path.

3. A guide as claimed in claim 2, wherein said guide ring is placed in contact with a forward end of a cutout surface defined by removing a side of a forward portion of a tip rod section, said guide ring acting as a top guide.

4. A guide as claimed in claim 1, wherein said guide ring is placed in a groove defined in said rod stock.

5. A guide as claimed in claim 1, wherein said guide ring includes an engaging device defined peripherally thereof.

6. A guide as claimed in claim 1, wherein said guide ring is placed in contact with a forward end of a tip rod section to act as a top guide.

7. A guide as claimed in claim 1 wherein said guide ring is place in contact with a forward end of a cutout surface defined by removing a side of a forward portion of a tip rod section, said guide ring acting as a top guide.

8. A fishing rod comprising:
a fixed guide including guide rings placed in close proximity to an outer surface of a rod stock for guiding a fishing line, and a holder for fixing said guide rings to said rod stock;
wherein said holder is formed integrally with a small diameter portion of said rod stock and formed of a material contacting said rod stock as viewed axially of said rod stock, an outer surface of said holder being smoothly continuous with an outer surface of said rod stock, said holder including a pair of inclined surfaces which converge away from said rod stock as viewed in a direction perpendicular to an axis of said rod stock, said guide rings being mounted on said inclined surfaces, respectively.

9. A guide for use on a fishing rod comprising:
a guide ring placed in contact with an outer surface of a rod stock for guiding a fishing line, said guide ring defining a substantially elliptic opening for receiving said fishing line and having an outer edge in a direction of shorter diameter contacting the outer surface of said rod stock; and
a holder for fixing said guide ring to said rod stock.

* * * * *

UNITED STATES PATENT AND TRADEMARK OFFICE
CERTIFICATE OF CORRECTION

PATENT NO. : 5,347,743
DATED : September 20, 1994
INVENTOR(S) : ISAMU TOKUDA, ET AL.

It is certified that error appears in the above-identified patent and that said Letters Patent is hereby corrected as shown below:

On the title page, item:

[21] Appln. No.

"953,659" should read --959,659--.

Signed and Sealed this

Seventh Day of March, 1995

Attest:

BRUCE LEHMAN

*Attesting Officer*  *Commissioner of Patents and Trademarks*